Aug. 22, 1950
A. P. MONTGOMERY
NEGATIVE BIAS LIMITER FOR AUTOMATIC
GAIN CONTROL CIRCUITS
Filed Jan. 8, 1948
2,520,012
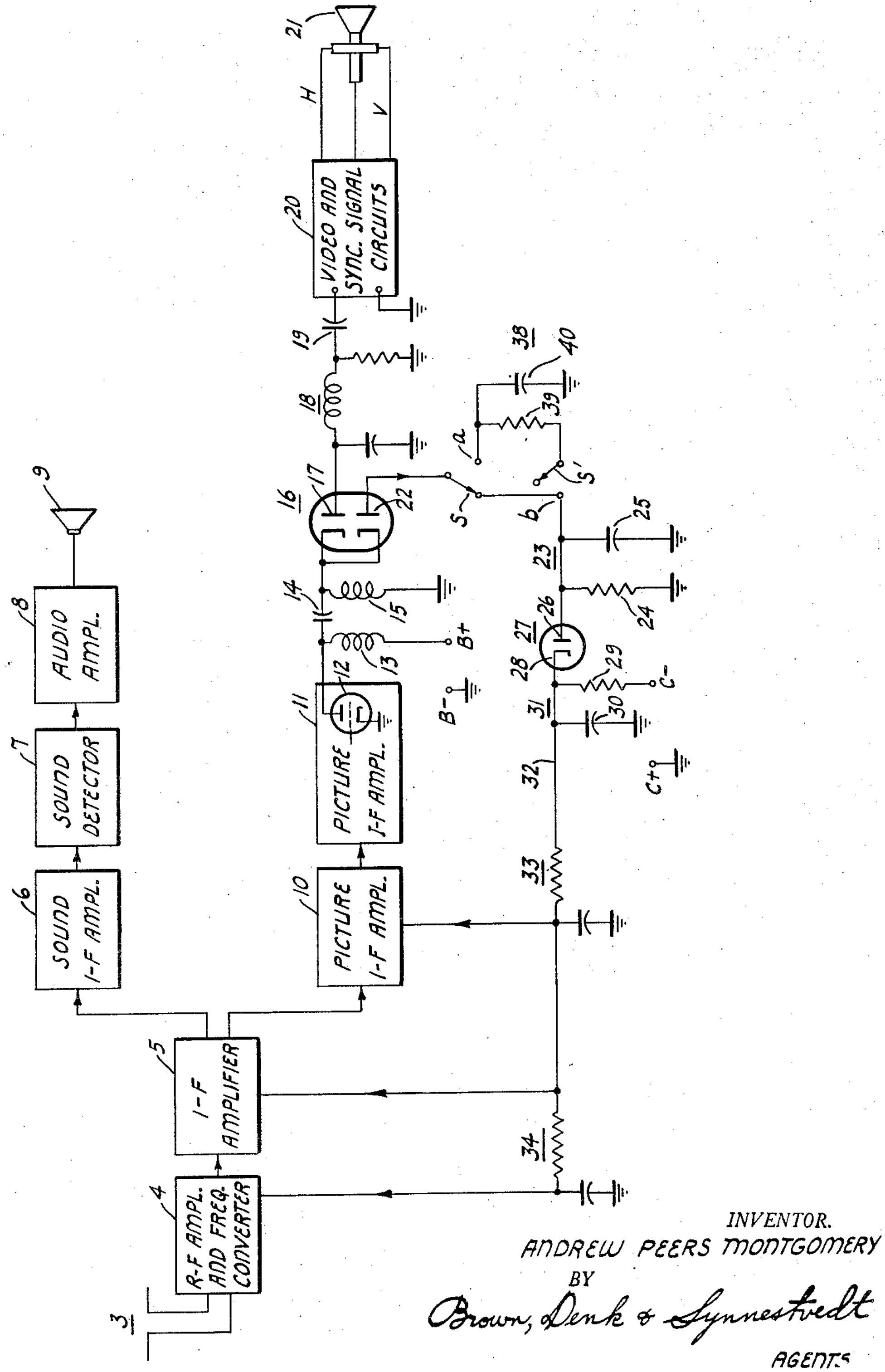
INVENTOR.
ANDREW PEERS MONTGOMERY
BY
Brown, Denk & Synnestvedt
AGENTS Patented Aug. 22, 1950 2,520,012

UNITED STATES PATENT OFFICE 2,520,012

NEGATIVE BIAS LIMITER FOR AUTOMATIC GAIN CONTROL CIRCUITS

Andrew Peers Montgomery, Philadelphia, Pa., assignor to Philco Corporation, Philadelphia, Pa., a corporation of Pennsylvania Application January 8, 1948, Serial No. 1,151

5 Claims. (Cl. 178—7.3)

The invention herein described and claimed relates to an improvement in the automatic-gain-control circuit of a television receiver. More particularly, the invention provides an improvement which renders the automatic-gain-control circuit substantially unresponsive to intermittent noise pulses, however strong, which may at times accompany the received picture signal.

An important purpose of the automatic-gain-control circuit of a television receiver is, of course, to maintain the amplitude of the video or picture signal at a level which provides a desired degree of picture contrast. But an even more important purpose is to maintain the level of the composite video signal relatively constant so that the synchronizing-signal separator or pickoff circuits of the receiver may function effectively to separate the horizontal and vertical synchronizing pulses from the composite signal. While most well designed pickoff circuits are adapted to function over a reasonably substantial range of applied signal amplitudes, such circuits nevertheless function better when provided with signals which are within a narrow range of predetermined amplitudes; and the circuits function best when the signal is of a fixed predetermined amplitude.

It is particularly important, insofar as effective performance of the pickoff circuits is concerned, that, when strong intermittent noise signals are present, the composite video signal applied to the pickoff circuits be maintained at a predetermined amplitude, or at least within a very narrow range on either side thereof. Prior art automatic-gain-control circuits have frequently been deficient in this respect, i. e. prior art circuits tend to be disturbed adversely in the presence of strong intermittent noise impulses.

It will be readily understood that to function properly, the automatic-gain-control system should develop a direct-current gain-control voltage whose magnitude is a direct function of the amplitude of the synchronizing signal, the amplitude of the synchronizing signal being indicative ordinarily of the strength of the received signal. Such as direct-current gain-control voltage is developed in the prior art circuits, and also in the improved circuit of the present invention, by means of a diode-rectifier circuit which levels on the synchronizing pulse tips. In many of the prior art arrangements, however, the diode-rectifier circuit tends to level also on the peaks of strong noise impulses which may unavoidably accompany the desired signal. Consequently, the magnitude of the automatic-gain-control voltage is not indicative at all times of received signal strength; it is at times indicative of the amplitude of received noise impulses.

Stated briefly, the automatic-gain-control voltage, in many of the prior art circuits, tends to vary erratically in the presence of strong noise impulses, and, as a result, the gain of the television receiver is varied in a corresponding manner, thus producing substantial variations in the level of the composite video signal. This is undesirable, of course, insofar as picture contrast is concerned. But an even more undesirable effect is that the pickoff circuits are called upon to perform under seriously adverse conditions. For, if the intermittent noise be strong enough, the automatic-gain-control voltage may reach a magnitude sufficient to so reduce the gain of the receiver that the pickoff circuits are unable to perform their intended function. When this occurs, synchronism between the deflecting circuits of the receiver and those at the transmitter is lost. Intermittent noise signals of relatively great strength are not unusual. On the contrary, strong intermittent noise signals are encountered frequently in commercial and industrial areas. It is important, therefore, that television receivers be capable of operating satisfactorily under severe noise conditions.

It is an object then of this invention to provide an improved automatic-gain-control system adapted particularly for use in television receivers.

It is another object of this invention to provide, for a television receiver, an improved automatic-gain-control circuit capable of developing a control voltage indicative of the relative amplitude of the received television signal substantially independent of intermittent noise signals, however strong.

These and other objects, features and advantages of the present invention, and the manner in which the objects are attained, will be readily understood from the following detailed description and accompanying drawing comprised of a single figure illustrating, partly diagrammatically, partly schematically, preferred embodiments of the present invention.

Referring now to the drawing, there is illustrated a television receiver whose components are entirely conventional except for the improvement introduced by the present invention. The television receiver shown in the drawing includes an antenna 3, an R.-F. amplifier and frequency-converter stage 4, and a composite-signal intermediate-frequency amplifier 5. The composite-signal I.-F. amplifier 5 has separate output circuits for the audio or sound I.-F. carrier signal and for the video or picture I.-F. carrier signal. The sound signal, in conventional manner, follows a path which comprises a sound I.-F. amplifier 6, a sound detector 7, an audio-frequency amplifier 8, and a loud speaker 9. The picture signal follows a path which includes, in cascade, picture I.-F. amplifier stages 10 and 11. The output signal of tube 12 of amplifier stage 11 is developed across a plate load primary coil 13 and is applied, by way of coupling capacitor 14 and secondary coil 15, to a double-diode 16 which functions as a video signal detector and as an automatic-gain-control device.

The upper diode 17 of double-diode 16 cooperates, in conventional manner, with the upper diode load network 18 to develop a detected video-signal voltage which is applied, by way of coupling capacitor 19, to conventional circuits including a video-frequency amplifier circuit, a synchronizing-signal pickoff circuit, and horizontal and vertical deflection-signal generator circuits, all of which are represented diagrammatically in the drawing by block 20. The amplified video-frequency signal, and the horizontal and vertical deflection currents, developed in the circuits of block 20, are applied in conventional manner to a suitable cathode-ray tube or picture reconstituting device 21. The system, thus far described, is entirely conventional and a more detailed description thereof is unnecessary.

The lower diode element 22, in combination with an RC network 23 comprising resistor 24 and capacitor 25, functions, in conventional manner, as a means for developing a negative direct-current voltage which is utilized for automatic-gain-control purposes in the novel manner to be described. The time constant of R. C. network 23 is long, in comparison with the intervals between the horizontal synchronizing pulses, in order to insure that the automatic-gain-control voltage appearing across network 23 is proportional to the peak applied carrier voltage obtaining during the synchronizing-signal intervals rather than to the average carrier voltage which varies continuously as a function of video-signal amplitude. The time constant of network 23 should not, of course, be so long as to make it impossible for the voltage developed thereacross to follow, with adequate promptness, significant changes in carrier peak amplitude. A satisfactory time constant for network 23 is of the order of five hundred microseconds, which, at existing United States television standards, is slightly less than the time duration of eight horizontal lines. The automatic-gain-control circuit, thus far described, is entirely conventional.

In accordance with the present invention, the negative direct-current voltage developed across network 23 is applied to the anode 26 of a diode 27. Anode 26 of the diode is biased positively, with respect to the cathode 28, to a value which is at least equal to, and preferably slightly greater than, the maximum negative gain-control voltage expected to be derived. The biasing of diode 27 may be accomplished by returning the cathode 28, to a source of negative potential, C—, by way of a resistor 29. Resistor 29 and capacitor 30 comprise an R. C. network 31 whose time constant is substantially longer than that of network 23. The time constant of network 31 may, for example, be of the order of one second, which, at present standards, is equivalent to approximately thirty picture frames.

The operation of the improved circuit of the present invention will now be readily understandable.

In the absence of an incoming carrier wave, diode 27 conducts and direct-current voltages are developed across resistors 29 and 24, these resistors functioning as a voltage divider. Resistor 29 is preferably substantially larger than resistor 24, so that the voltage drop across resistor 29 will be substantially larger than that across resistor 24. The resistance of diode 27, when conducting, is negligible and may be ignored so far as this discussion is concerned. It will be seen then that, in the absence of an incoming carrier wave, the potential of cathode 28 is negative, with respect to ground, by an amount which is determined by the magnitude of the negative supply voltage, C—, and by the relative values of resistors 29 and 24, functioning as a voltage divider.

When a carrier wave is received, a negative gain-control voltage is developed in customary manner across network 23 and appears on the anode 26. The magnitude of the gain-control voltage thus developed is, however, smaller than that of the negative supply voltage, C—, which, as previously indicated, is chosen to be as large as, and preferably slightly larger than, the maximum gain-control voltage expected to be derived. Diode 27 therefore continues to conduct and the potential of cathode 28, with respect to ground, is therefore substantially equal to the conventionally developed gain-control voltage appearing on anode 26.

The negative direct-current potential thus appearing on cathode 28 may be utilized as the automatic-gain-control voltage and may be applied in conventional manner to the grids of preceding I.-F. and/or R.-F. amplifier stages. In the drawing, the voltage is shown to be applied, by way of filter network 33, to the composite-signal I.-F. amplifier 5 and to picture I.-F. amplifier 10, and, by way of filter network 34, to the R.-F. amplifier and frequency-converter stages 4.

Consider now the effect of strong intermittent noise impulses which at times accompany the desired television signal. These noise pulses are impressed upon the lower diode element 22, and as a result, a large negative voltage is developed across the diode load network 23, the effect of which is to cut off momentarily diode 27. The time constant of network 23, is, however, short, in comparison with that of network 31, and the voltage on anode 26 returns to its previous less-negative value before substantially any change occurs in the potential of cathode 28. It is seen then that diode 27 effectively isolates the automatic-gain-control lead 32 from that portion of the gain-control circuit which is responsive to intermittent noise impulses.

While the improved circuit of the present invention is substantially unresponsive to noise impulses, as just described, the circuit is nevertheless adequately responsive to variations in the peak amplitude of the carrier wave occasioned by variations in carrier strength. Such variations are relatively small, ordinarily, in comparison with the variations in peak amplitude occurring when a strong noise impulse accompanies the desired carrier signal. Observe that, if the strength of the carrier wave diminishes, the gain-control voltage derived from diode 22 and appearing on anode 26 becomes less negative. Diode 27 thereupon conducts more strongly, and the potential of cathode 28 becomes correspondingly less negative. On the other hand, if the strength of the carrier wave increases, relatively suddenly, the potential of anode 26 becomes more negative. Diode 27 thereupon cuts off, momentarily, and capacitor 30 charges to the potential of anode 26, since the magnitude of the supply voltage, C—, is more negative than the expected maximum negative potential of anode 26.

It will be observed that when the potential of anode 26 becomes increasingly negative, as a result of an increase in carrier strength, the potential of cathode 28 follows the increase in the negative potential of anode 26, but with some slight delay or lag. The lag, which is introduced by the relatively long time constant of network 31 is not, however, objectionable.

The scope of the variations which may be effected in the potential of cathode 28 is, of course, not without limits. The limits are determined by the magnitude of the negative voltage supply, C—, and by the relative magnitudes of resistors 29 and 24. Ordinarily, as previously indicated, resistor 29 will be substantially larger than resistor 24. Observe that the minimum potential which can appear at cathode 28 is different from zero, is negative in polarity, and is determined by the magnitude of the supply voltage, C—, and by the voltage division which is effected by resistors 29 and 24 when diode 27 is conducting. The emission velocity of the diode also has a bearing but the effect is relatively small and may be neglected so far as this discussion is concerned. The minimum negative potential establishable at cathode 28 may be utilized as a component of the fixed bias normally applied to the I.-F. and R.-F. stages. The maximum magnitude of gain-control potential that may appear at cathode 28 is, of course, substantially equal to the magnitude of the supply voltage, C—, which, as previously mentioned, is as large as, and preferably slightly larger than, the maximum gain-control voltage expected to be derived.

In some cases, it may be advantageous to insert, between diode 22 and diode load network 23, an auxiliary load network 38 comprising a series resistor 39 of relatively large value and a shunt capacitor 40 of small value. Such an auxiliary load network may be inserted, in the circuit of the drawing, by moving switches S and S' to positions *a* and *b* respectively. The value of capacitor 25 is very large compared with that of capacitor 40, and the time constant of network 38 is determined by the values of capacitor 40 and resistor 39, without regard to the presence of capacitor 25 and resistor 24. The time constant of network 38 should be short, preferably less than one horizontal line period, which under present United States standards is approximately 63.5 microseconds.

The beneficial action of network 38 may be briefly described as follows: When a strong noise impulse is impressed upon lower diode 22, capacitor 40 charges to the peak rectified voltage level. Resistor 39, being large, serves to momentarily isolate capacitor 25 from the noise voltage thus developed across capacitor 40. If the noise impulse persists, capacitor 25 will charge at a rate determined by the time constant of resistor 39 and capacitor 25. Resistor 24 will ordinarily be substantially larger than resistor 39 and will not affect materially the charging time of capacitor 25. But the value of resistor 24, relative to that of resistor 39, determines the peak rectified voltage toward which capacitor 25 charges, for resistors 39 and 24 function as a voltage divider with respect to voltages applied thereacross. The time constant of resistor 39 and capacitor 25 will ordinarily be substantially longer than the duration of a noise pulse, and capacitor 25 will therefore charge to but a fraction of the peak rectified noise voltage.

As indicated above, capacitor 40 does charge to the peak noise level, but capacitor 40 is small and hence derives but a small charge from the impressed noise voltage. The charge thus acquired passes off through resistor 39 and into the very much larger capacitor 25. The terminal voltage of capacitor 25 is affected but to a negligible extent. It will therefore be seen that the presence of network 38 minimizes, to a very appreciable extent, the effect of intermittent noise impulses upon the gain-control system.

For the purpose of further clarifying my invention, I present below illustrative values for certain of the pertinent circuit elements. It is to be understood, however, that these values are by way of illustration only, and are not limiting.

| | | |
|---|---|---|
| Capacitor 25 | μμf | 1000 |
| Resistor 24 | ohms | 470,000 |
| Resistor 29 | megohms | 2.2 |
| Capacitor 30 | μf | 0.5 |
| Bias (C—) | volts | —5 |

When network 38 is used, the values may be as follows:

| | | |
|---|---|---|
| Capacitor 40 | μμf | 27 |
| Resistor 39 | ohms | 100,000 |

In my experiments, I found that if either of the circuit empodiments, shown in the drawing and described above, were employed, the automatic-gain-control system became substantially immune to intermittent noise impulses, even though very strong.

Various modifications within the limits of my basic concept will occur to those skilled in the art.

Having described my invention, I claim:

1. In a television receiver adapted to receive a television signal having a predetermined frame period, an automatic-gain-control circuit comprising: a first diode; a load network for said first diode, said load network including a resistance and capacitance having an RC time constant substantially shorter than one frame period; means for applying a carrier wave to said first diode, said carrier wave being amplitude modulated with both picture and synchronizing intelligence, said first diode being so poled that a direct-current automatic-gain-control voltage of preselected polarity is developed across said first diode load network; a second diode; a load network for said second diode, said load network for said second diode comprising a resistance and capacitance having an RC time constant substantially longer than one frame period; a source of biasing voltage of preselected magnitude; means for connecting said source of biasing voltage to said second diode in such manner that said second diode is normally conductive; means for applying the direct-current automatic-gain-control voltage developed across said first diode network to said second diode in such manner as to oppose said bias; and means for utilizing the direct-current voltage developed across said second diode load network to control the gain of said television receiver.

2. In a television receiver adapted to receive a television signal having a predetermined frame period, an improved automatic-gain-control circuit comprising: a first rectifier; a load network for said first rectifier, said load network including a resistance and capacitance having an RC time constant substantially shorter than one frame period; means for applying a carrier wave to said first rectifier, said carrier wave being amplitude modulated with both picture and synchronizing intelligence, said first rectifier being so poled that a direct-current automatic-gain-control voltage of preselected polarity is developed across said first rectifier load network; a second rectifier; a load network for said second rectifier, said load network for said second rectifier comprising a resistance and capacitance having an RC time constant substantially longer than one frame period; a source of biasing voltage of preselected magnitude; means, including said resistance of said second rectifier load network, for connecting said source of biasing voltage to said second rectifier in such manner that said second rectifier is normally conductive; means for applying the direct-current automatic-gain-control voltage developed across said first rectifier load network to said second rectifier in such manner as to oppose said bias; and means for utilizing the direct-current voltage developed across said second rectifier load network to control the gain of said television receiver.

3. In a television receiver adapted to receive a television signal having a predetermined frame period, said receiver including means for developing a unidirectional automatic-gain-control voltage of preselected polarity, and utilization means for said automatic-gain-control voltage, said first-named means comprising a first rectifier and a parallel-connected resistance-capacitance load network for said first rectifier, said load network having an RC time constant substantially shorter than one frame period, the improvement which comprises the provision of: means, including a second rectifier, for applying said developed automatic-gain-control voltage to said utilization means, said second rectifier being connected in series between said first-named means and said utilization means and so poled that said developed automatic-gain-control voltage tends to oppose current flow through said second rectifier; a source of biasing voltage of predetermined magnitude, said predetermined magnitude of biasing voltage being substantially equal to the maximum automatic-gain-control voltage expected to be developed from said television signal in the absence of noise or other spurious signals; means connecting said source of biasing voltage to said second rectifier in such polarity as to tend to maintain current through said second rectifier; and a parallel-connected resistance-capacitance load network for said second rectifier connected between said second rectifier and said utilization means, said last-named load network including said bias-voltage connecting means, said last-named load network having an RC time constant substantially longer than one frame period.

4. The combination claimed in claim 3 characterized by the fact that said source of biasing voltage is connected in series with said resistance of said second-rectifier network, said second rectifier, and said resistance of said first-rectifier network.

5. The combination claimed in claim 4 characterized by the fact that said resistance of said second-rectifier network is at least several times larger than said resistance of said first-rectifier network.

ANDREW PEERS MONTGOMERY.

REFERENCES CITED

The following references are of record in the file of this patent:

UNITED STATES PATENTS

| Number | Name | Date |
|---|---|---|
| 2,171,636 | Seeley | Sept. 5, 1939 |
| 2,200,049 | Van Loon | May 7, 1940 |
| 2,227,001 | Schlesinger | Dec. 31, 1940 |
| 2,240,533 | Wilson | May 6, 1941 |
| 2,296,393 | Martinelli | Sept. 22, 1942 |
| 2,299,292 | Allen | Oct. 20, 1942 |
| 2,402,096 | Somers | June 11, 1946 |